US005767943A

United States Patent [19]

Oberhardt et al.

[11] Patent Number: 5,767,943

[45] Date of Patent: Jun. 16, 1998

[54] PHOTOGRAPHIC PRINTING APPARATUS HAVING MULTIPLE FILM ENTRY POINTS

[75] Inventors: Knut Oberhardt, Foching; Edmund Mangold, Ohlstadt; Bernhard Lorenz, Freising, all of Germany

[73] Assignee: Agfa-Gevaert Aktiengesellschaft, Leverkusen, Germany

[21] Appl. No.: 731,518

[22] Filed: Oct. 16, 1996

[30] Foreign Application Priority Data

Oct. 25, 1995 [DE] Germany ........................ 195 39 703.7

[51] Int. Cl.$^{6}$ ........................... G03B 27/00; G03B 27/62

[52] U.S. Cl. ................................................ 355/18; 355/75

[58] Field of Search ........................ 355/91, 75; 396/612, 396/622, 594, 595, 598, 599, 624

[56] References Cited

U.S. PATENT DOCUMENTS

| | | | |
|---|---|---|---|
| 3,699,869 | 10/1972 | Jensen | 396/626 |
| 4,402,590 | 9/1983 | Rubin | 396/626 |
| 4,872,033 | 10/1989 | Watanabe et al. | 355/27 |
| 5,614,986 | 3/1997 | Yoshikawa et al. | 355/75 |

*Primary Examiner*—D. Rutledge

*Attorney, Agent, or Firm*—Furgang & Milde, LLP

[57] ABSTRACT

Photographic printing apparatus is disclosed with a common guidance and transport device for the films. Several entry points are adapted in size and shape to various films and/or cartridges. Each of these input points has a separate guidance and transport device. A transfer station is provided which transports the films from the guidance and transport devices of the entry points into the common guidance and transport device through the printing apparatus.

13 Claims, 2 Drawing Sheets

PHOTOGRAPHIC PRINTING APPARATUS HAVING MULTIPLE FILM ENTRY POINTS

BACKGROUND OF THE INVENTION

The invention relates to photographic printing apparatus having multiple film entry points, in particular a film entry point for film strips and a separate film entry point for film received from film cartridges. Each entry point has a separate film guidance and transport device. The printing apparatus has a common operating station with a guidance and transport device arranged to receive film from both entry points.

The published European patent application No. EP-OS 571 805 discloses a film cartridge which contains a film wound onto a spool whose guiding section does not project from the cartridge. Further, the published European patent application No. EP-OS 664 483 discloses a development laboratory for films and cartridges of this type in which the film strip is again wound back into the cartridges following printing, and is thus delivered with the pictures to the client.

In the published German application No. DE-OS 40 38 661 a suggestion is made to wind the film back into the cartridge following development, and to use a printing device in which this cartridge is inserted, whereupon the developed film is wound out of the cartridge for the printing process and then wound back in again.

On the other hand, the previous small picture format is used as before; that is, the film is removed from the cartridge before development, and thereafter exists in the form of a film strip for any subsequent processing steps.

The published European Patent Application No. EP OS 677,771 discloses a photographic printing apparatus which can process any one of a roll of spliced film, a strip of film detached from a cartridge, and a film housed in a cartridge. This apparatus is relatively complex and requires skilled labor to operate.

SUMMARY OF THE INVENTION

The principal object of the present invention is to configure an apparatus for printing photographic film in such a way that both films in cartridges and film strips can be processed in such a way that operational errors can be obviated with great certainty.

This object, as well as other objects which will become apparent from the discussion that follows, are achieved, in accordance with the present invention, by providing a transfer station which transfers film from the guidance and transport devices of the film entry points to the guidance and transport device of the common operating station of the printing apparatus and by providing an additional entry point for film strips received from film development apparatus.

In particular, for a so-called mini-lab, the universal adjustment capacity for different film systems is especially important because these devices often must be accommodated in very limited spaces, and several devices simultaneously could not be set up. In addition, in this field one must often deal with untrained, or at best superficially trained, work forces, so that the devices must be designed in such a way that entry errors are avoided. By the presence of multiple entry points that are appropriately adapted to the various input media, it is possible to prevent such mishaps as inserting a film backwards into the entry opening of a cartridge. Similarly by configuring the receptacle for a particular cartridge, or by other locking devices, such mistakes as placing a small picture cartridge into a large cartridge entry point can be avoided. The transfer point makes it possible for the major portion of the apparatus to be used in commonality for all systems and formats. New systems can thereby be established more quickly on the market. This is because it will not be necessary for new systems to be purchased in their entirety by developing laboratories or mini-lab operators, but rather only auxiliary parts to already existing systems.

The apparatus according to the invention exhibits at least one entry point for cartridges, as they are described in the aforementioned DE-OS 40 38 661. It also has an additional entry point for traditional film strips in the small-picture format. The cartridge holder is advantageously configured such that the cartridges can be inserted only in one orientation. Erroneous insertions can be avoided from the outset by this means. If this arrangement is not possible in retrofitting existing systems, then means are provided which detect the orientation of the cartridge in the cartridge receiver, and if a wrong insertion has been made, they generate an appropriate warning or an alarm signal. The same type of means is provided at the entry point for film strips, since here also a wrong insertion is possible. In particular, in this case it matters that the emulsion layer of the film strip exhibit the proper orientation, since otherwise the paper prints will be produced the wrong way around. Determination of the orientation of the inserted film strip can be done by such things as the DX code, as described in the U. S. Pat. No. 5,248,887.

If the mini-lab is connected to film development in such a way that the film strips are transferred directly from film development to the printing section of the mini-lab, then it is advantageous to provide a third entry point for this section for these film strips coming from the developing device.

The entry points can be placed on a motor-driven, vertically adjustable carriage. If the mini-lab is so arranged that the actual printing section or point can be automatically adapted to different formats, then the overall control of the device can be done by insertion of the cartridges or film strips. As an example, if a cartridge is inserted into the entry station provided for it, then the carrier is moved so that the guidance and transport facility of this entry point can transfer the film directly to the guidance and transport facility via the printing point. Simultaneously the printing point can be adapted to the format of the film in the cartridge. This can take place either by a change of parts or by automatic substitution of the entire platform.

A simpler, but equally viable possibility is to install the individual entry points permanently. The guidance and transport facilities of the entry points are then so placed that they lead into the guidance and transport facility via the printing point. Normally this can occur so that no motor adjustment in the transfer point is necessary.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
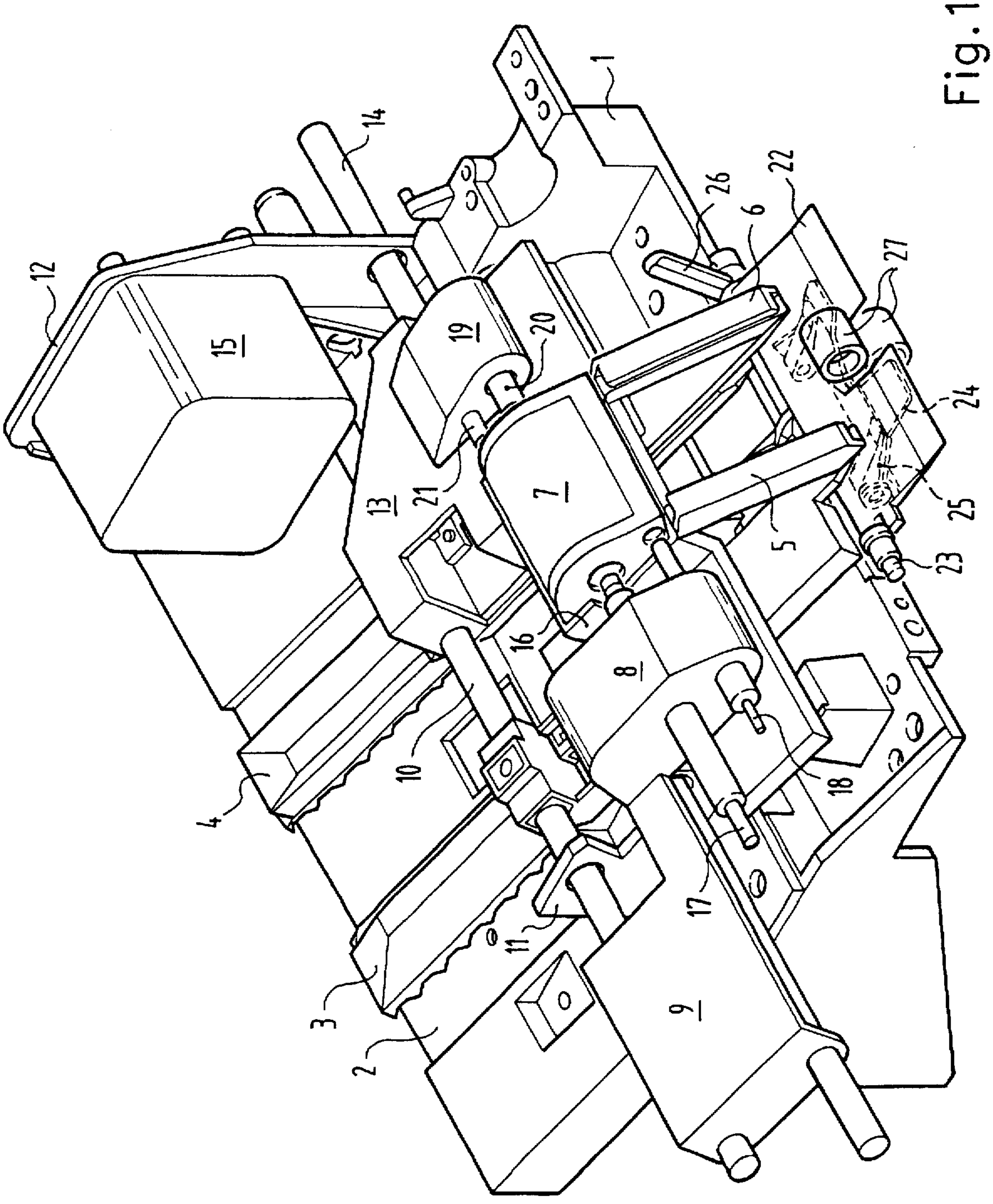
FIG. 1 is a perspective view of photographic film processing apparatus according to the invention with three entry points.

The preferred embodiments of the present invention will now be described with reference to FIGS. 1–3 of the drawings. Identical elements in the various figures are designated with the same reference numerals.

All parts of the apparatus shown in FIG. 1 are mounted on a common base plate 1. The base plate has a groove 2, in which edge guides 3 and 4 for the film strips are adjustably situated. The side guides 5, 6 for the film in a film cartridge 7 are securely attached to these edge guides.

The drive unit 8 for the cartridge 7 is connected via a connection element 9 and an actuating rod 10 with the guides 3 and 5. The actuating rod 10 is placed so as to move axially in the housing-secured bearing parts 11 and 12. Whereas the actuating rod 10 is securely fastened with the connection element 9 and the edge guide 3, a connection element 13 can be moved axially on them.

In contrast, an actuating rod 14, which can also be moved axially in bearing parts 11 and 12, is firmly attached via the connection element 13 to guides 4 and 6, while the connection element 9 is mounted on them so as to be axially movable. Actuating rods 10 and 14 are movable in opposed fashion by a motor 15 and a worm drive (which is not depicted in detail). In this way the guides for the film are symmetrically adjustable.

The film cartridge 7 lies in a cartridge holder 16, which is exactly fitted to the exterior shape of the cartridge. The drive unit 8 exhibits a shaft 17 for driving the film spool in the cartridge and a shaft 18 for opening the cartridge closure. (A drive for these shafts is not depicted in the drawing.) A supporting member 19 is attached to the connection element 13 and moves together with it. This supporting member 19 contains a support pin 20, which supports the film spool during film entry, and a sensor 21 which recognizes whether the film in the cartridge is already developed or not.

Beneath the guides 3, 4 and 5, 6, a flap 22 is attached in swivelable fashion via a spindle 23. Beneath the flap 22 is attached a guide member 24 (shown in dashed lines). This guide member is mounted in swivelable fashion by means of a spindle parallel to spindle 23. The guide member 24 is spring loaded against the flap 22 so that the runners 25 touch the flap 22. The flap 22 can be moved in swivelable fashion via a control lever 26. A pair of driving rollers 27 are used in common by all inserted films.

Figure 2:
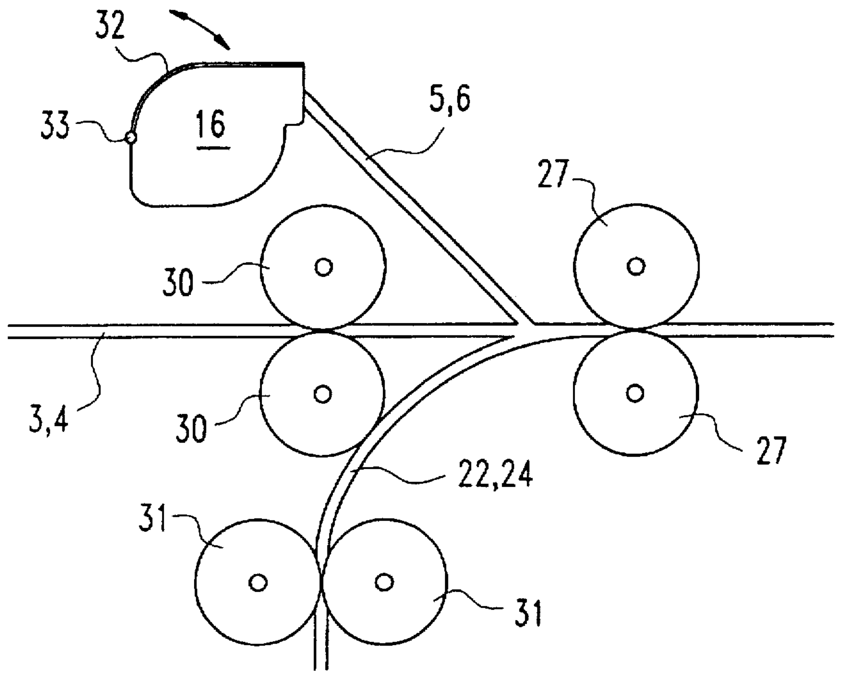
FIG. 2 is a schematic diagram showing the operational characteristics of the apparatus of FIG. 1.

The principle of operation of the apparatus of FIG. 1 is schematically depicted in FIG. 2. The various settings of the apparatus, which are adjusted by the motor 15, can, for example, be combined with the use of various printing plates adapted to the particular format in the photographic printing device (indicated by the black 50). Therefore, in the setting shown, a printing plate would be used that is adapted to the format of the film found in the cartridge 7. A lid 32 with a hinge 33 is provided on the cartridge holder 16 to prevent the insertion of a cartridge, if desired. Insertion of the cartridge is detected by light sensors (that are not depicted here), whereupon motor 15 goes into operation and the drive unit 8 and support member 19 are moved sufficiently far so that the shaft 17 is coupled with the spool of the cartridge. Simultaneous with support member 19 and drive unit 8, guides 5 and 6 are moved to the necessary interval distance. Using the attained setting, a check can once again be made of whether the cartridge 7 has been correctly placed in the cartridge holder 16. If this is the case, then, by means of the sensor 21 it is ensured that the film in the cartridge in fact was already developed and is therefore no longer sensitive to light. Thereafter, the cartridge closure is opened by means of the shaft 18, and shaft 17 is driven so that the film leader is pushed out through the guides 5 and 6 as far as the drive rollers 27. From here the film can now be led through the printing device, and following the printing process it can be wound back into the cartridge again. Thereupon the cartridge closure is again closed by the shaft 18 and the motor 15 moves the drive unit 8, support member 19 and the guides 5 and 6 back into the setting shown in FIG. 1.

If a small picture film as customarily found in the trade is to be printed, the appropriate printing plate is placed into the printing device. Thereupon, the motor 15 moves edge guides 3, 4 until they exhibit the proper interval distance. To still further ensure the correct entry, and to preclude any possibility of the small picture film being entered via guides 5 and 6, simultaneously a lid (not shown here) can be closed over the cartridge holder 16. If the film is now properly inserted via edge guides 3, 4, then, by means of a DX code reader in edge guides 3, 4 (as disclosed in the aforementioned U.S. Pat. No. 5,248,887), the particular edge area of the film strip will be scanned, and a determination will be made on which side the DX code is located. Using the position of the DX code and the reading direction, the orientation of the film strip can be determined. If a wrong entry is determined, the servicing person is asked to correct the position of the film. To get the film past the DX code readers at the specified speed, the film leader is inserted into the drive rollers 30 (FIG. 2). If entry has been done correctly, these drive rollers then lead the film to the drive rollers 27.

The apparatus shown in FIG. 1 includes a third entry point, which forwards a film directly from a developing section (arranged below the apparatus shown) to the printing section. This film is forwarded from below through drive rollers 31 (FIG. 2). For this purpose, the flap 22, and the guide member 24 that lies on it, is lifted by the control lever 26 into a setting in which the film leader led through the underside of flap 22, can be drawn toward the drive rollers 27. The film leader pushes between the runners 25 of the guide member 24 and the underside of the flap 22. By this means a gap is formed between the guide member 24 and the flap 22, wide enough so that there is no danger of the film being scratched. The runners 25 are placed in such a way that they touch the film at its edges. The film leader is thus grasped by the rollers 27 and transported into the printing device (toward the right in the illustration of FIG. 2). As soon as the end of the film leaves the gap between the flap 22 and the guide member 24, this guide member is compressed against the flap 22 again by a spring (not shown). After the printing process, the film can then be guided back in the opposite direction into an outlet compartment beneath the device shown. Since the gap between the flap 22 and guide member 24 is now closed, the guided film end runs against the underside of the guide member 24 and is led by it directly into the collecting compartment.

Figure 3:
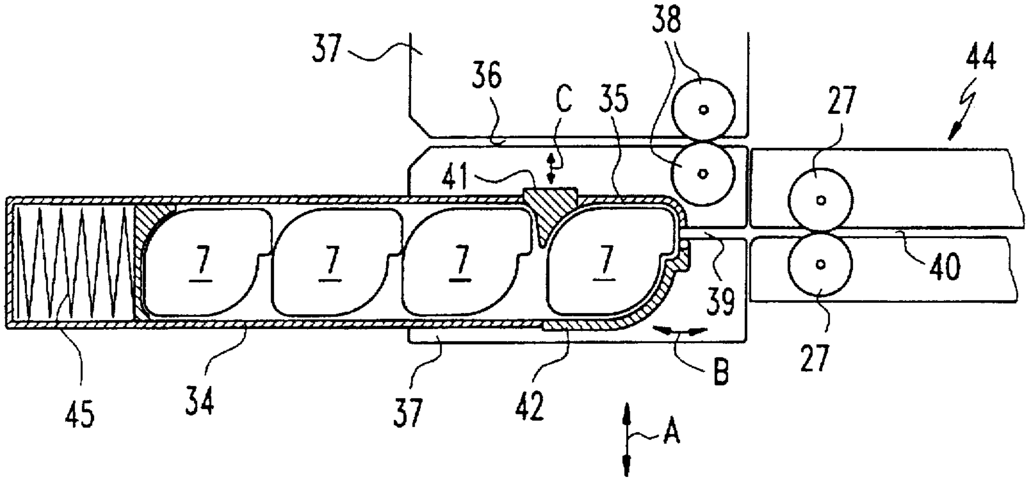
FIG. 3 is a schematic diagram showing the operational characteristics of a modified embodiment of the apparatus of FIG. 1.

The operational procedure of a further embodiment is depicted in FIG. 3. Here, a cartridge holder 35 and a film strip guide 39 are arranged in a carriage 37. Moreover, driving rollers 38 and drives for the film spool and the cartridge closer are provided in this carriage. The carriage 37 can be moved (up and down in the illustrating FIG. 3) in the direction of the double arrow A. If the carriage 37 is in the position depicted in FIG. 3, then a film in the cartridge holder 35 can be coiled out of a cartridge 7 and be drawn via the film guide 39 to the drive roller s 27.

If, in contrast, a small picture film is inserted via a film guide 36, then the carriage is moved (downward) so that the film guide 36 is aligned with the film guide 40 of the printing device.

The guidance and transport device 44 which comprises the drive rollers 27 and the film guide 40 is adjustable (up or down) in position and is also replaceable as a unit.

The film cartridges 7 are supplied to the cartridge holder 35 by means of a magazine 34. After the film in a film cartridge 7 has been processed, a flap 42 is opened outward, as indicated by the double arrow B, so that the processed cartridge can drop downward out of the carriage 37. Thereafter, the flap 42 is returned to its normal position (as shown in FIG. 3) and the end stop device 41 is moved upward, as indicated by the double arrow C. After the stop 41 is moved out of the way, the next cartridge 7 will be inserted into the cartridge holder 35 with the aid of the magazine spring 45. Thereafter, the stopper 41 is moved downward again to its normal position (as shown) so that the cartridge 7 in the holder 35 will not be affected by the pressure of the spring 45.

In the embodiment of FIG. 3, the film guides 36 and 39 have not changed in width. Therefore, while a film is being printed from the cartridge 7 in the cartridge holder 35, for example, a small picture film can be placed into the guide 36. The start or leader of the film will be held stationary by the rollers 38, until the film whose processing has just been completed is coiled back through the guide 39 into the cartridge 7 in cartridge holder 35. Then the carriage 37 moves downward and the rollers 38 can transfer the small picture film to the drive rollers 27.

There has thus been shown and described a novel photographic printing apparatus, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. In photographic printing apparatus having a first film entry point for film strips and a second film entry point for film cartridges, wherein each entry point has a separate film guidance and transport device, said printing apparatus having a common operating station with a film guidance and transport device arranged to receive film from both first and second entry points, the improvement comprising a transfer station which transfers films from the guidance and transport devices of the first and second entry points to the guidance and transport device of the operating station, and comprising a third film entry point for film strips received from a film development apparatus.

2. The apparatus according to claim 1, having a film cartridge holder which is shaped so that the cartridge can be placed in it in only one orientation.

3. The apparatus according to claim 1, wherein at least one entry point is configured as a film strip holder.

4. The apparatus according to claim 3, wherein the film strip holder is shaped so that film strips can be transferred from the film development apparatus.

5. The apparatus according to claim 1, wherein, at the guidance and transport device of at least one entry point, means are provided for checking the orientation of the entered films or cartridges.

6. The apparatus according to claim 5, wherein a warning message is generated if the item is inserted incorrectly.

7. The apparatus according to claim 1, wherein the entry points are mounted on a carriage which can be moved so that in each case one of the guidance and transport devices of the entry points is connected with the common guidance and transport device.

8. The apparatus according to claim 1, wherein the entry points are locationally fixed and the guidance and transport devices of the entry points all lead into the guidance and transport device of the operating station.

9. The apparatus according to claim 8, wherein, at a common discharge point of the printing apparatus, an adjustable flap is provided as a diversion for the film.

10. The apparatus according to claim 1, wherein the guidance and transport device of the operating station is adjustable or replaceable.

11. The apparatus according to claim 1, wherein at least one entry point includes means for preventing acceptance of an entered medium that is not meant for that entry point.

12. The apparatus according to claim 1, wherein at least one entry point includes a magazine for holding and inserting film.

13. The apparatus according to claim 1, wherein at least one entry point includes means for blocking the admission of a film or a film cartridge.

* * * * *